United States Patent

[11] 3,615,980

[72] Inventors John F. Schuck
12625 La Cresta Drive, Los Altos Hills, Calif. 92022;
Daniel J. Rose, 425 Poppy Drive, Mountain View, Calif. 94040; Chan Huan Wang, 19685 Via Escuela, Saratoga, Calif. 95070

[21] Appl. No. 11,021
[22] Filed Feb. 12, 1970
[23] Continuation-in-part of Ser. No. 679,972, Nov. 2, 1967, abandoned.
[45] Patented Oct. 26, 1971

[54] DECAL METALLIZATION OF CERAMIC SUBSTRATES
6 Claims, No Drawings

[52] U.S. Cl. .......... 156/89, 156/240, 117/3.3
[51] Int. Cl. .......... C04b 37/00
[50] Field of Search .......... 156/89, 240; 117/3.3, 3.2

[56] References Cited

UNITED STATES PATENTS

| | | | |
|---|---|---|---|
| 271,590 | 2/1883 | Anderson | 156/89 |
| 2,111,897 | 3/1938 | McNutt | 156/89 |
| 2,970,076 | 1/1961 | Porth | 156/89 |

*Primary Examiner*—Carl D. Quarforth
*Assistant Examiner*—Harvey E. Behrend
*Attorneys*—Roger S. Borovoy and Alan H. MacPherson

ABSTRACT: A process for applying a metal pattern to a ceramic substrate by applying to the substrate a decal having a metal pattern admixed with a removable binder. The substrate and decal are then heated in a two step heating cycle, first to remove the binder from the metal pattern and second to bond the metal pattern to the substrate.

DECAL METALLIZATION OF CERAMIC SUBSTRATES

CROSS-REFERENCE TO RELATED APPLICATION

This application is a continuation-in-part of patent application Ser. No. 679,972, filed Nov. 2, 1967 and now abandoned.

BACKGROUND OF THE INVENTION

In the past, metal patterns have been applied to a substrate by printing the pattern by silk-screen techniques, or by applying metal to the entire surface and removing portions by photoetching. Alternatively, the pattern has been printed on release paper, the release paper placed against the substrate and removed, leaving the metal pattern on the substrate. One example of such a procedure is shown in U.S. Pat. No. 3,240,642. The patent states that, while it might be expected that circuit components could be printed on a support by known transfer techniques such as decals, previous efforts to adapt these techniques have failed. The failure has been attributed primarily either to high processing costs which render the imprinting an impractical solution, or to the fact that burning off or otherwise removing the organic binder incident to the printing distorted the circuit pattern and destroyed its necessary electrical properties. Accordingly, the prior art thus far has been limited to familiar and complicated photolithographic or silk-screening techniques, or the the techniques described in U.S. Pat. No. 3,240,642, discussed above.

SUMMARY OF THE INVENTION

Contrary to the express statements in the patent based upon a knowledge of the prior art, a new process has been invented for applying a metal pattern to a ceramic substrate using a decal without harm either to the pattern or to the substrate.

Briefly, the two step process of the invention comprises: applying to the ceramic substrate a decal having a metal pattern admixed with a removable binder or a backing sheet; heating the substrate and the decal at a temperature between about 225° C. and 625° C. for a period of time between about 1 minute and one hour to separate the binder and the backing material from the metal patterns to leave the metal pattern remaining alone on the substrate; and heating the substrate and metal pattern to a temperature between about 800° C. and 1,600 ° C. to bond the metal pattern to the substrate. This process has been found to be capable of accurately depositing very fine metal circuit patterns on a ceramic substrate. Much more accurate patterns may be formed on the smooth decal backing sheet than can be formed, as in the prior art, directly upon the less smooth ceramic substrate. Because ceramics are inherently partly or completely crystalline or devitrified, ceramic surfaces are rough compared to a smooth vitreous surface or to a smooth decal backing sheet. Thus the ceramic surface is herein referred to as "rough" or "less smooth." This crystalline structure of ceramics is taught, for example, on page 10 of Kingery's book "Introduction to Ceramics" (2nd printing) published in June 1963 by John Wiley & Sons.

DETAILED DESCRIPTION

The metallized substrates of this invention are particularly useful in the fabrication of semiconductor integrated circuits. The process starts with the preparation of the decal. Preparation of metallized decals is well known in the art. In this invention, a refractory metal is employed, such as molybdenum, tungsten or their oxides. For better adherence, conventional additives may be mixed with the metal, such as chromium, manganese, titanium, or their oxides. These additives are well known in the preparation of metallizing paint. The metal and the additives are admixed with a conventional removal binder material, such as nitrocellulose. A thin layer of the mixture, for example from 0.0001 to 0.005 inches, is deposited on a first backing sheet. The first backing sheet itself is the same type of material as the binder material, although it need not necessarily be the same material. The backing sheet, however, should be capable of being vaporized or burned along with the binder at the temperatures used in the process of this invention. One type of backing material is nitrocellulose.

The completed decals are normally attached to a second backing sheet or tape for ease of application to the ceramic substrate. The decal containing the metal pattern on the first backing material is then applied to the ceramic substrate by removing it from the second backing sheet tape. The decal and substrate are heated at a temperature between about 225° C. and 625° C., preferably about 250° C. and 350° C. The time required for this heating step is between about 1 minute and 1 hour, preferably between about 10 and 20 minutes. This time is somewhat dependent upon the thickness of the metallizing pattern. The minimum time is dependent upon the material used in the binder and the backing material, since the time must be sufficient to completely remove the binder. Removal may occur by combustion or vaporization of the binder and the backing sheet. The time and temperature must be less than that required to sublime or excessively oxidize the metal which forms the pattern. This first heating step is carried out in an oxidizing atmosphere in order to permit vaporization or combustion of the binder and backing sheet and in order to prevent formation of carbonaceous residues as are often formed in reducing environments. In some cases, depending on the type of binder material, a moist reducing atmosphere such as wet hydrogen, wet dissociated ammonia or wet mixture of hydrogen and nitrogen can be used.

After the binder and backing sheet have been removed, the substrate is then fired a second time at a higher temperature, between about 800° C. and 1,600° C. to finally bond the metal pattern to the substrate. Preferably, a temperature between about 1,400° C. and 1,600° C. is employed. This temperature is dependent upon the particular metal used in the metallizing pattern. Preferably, the second step is carried out in a reducing atmosphere, for example in a mixture of hydrogen and water vapor (known in the art as wet hydrogen) or in a mixture of hydrogen and nitrogen.

After cooling the metallized substrate to room temperature, it can be plated, soldered, brazed, or hermetically sealed by the use of any of the standard techniques employed in the conventional fabrication of integrated circuit packages.

One of the advantages of the process of the subject invention is that it can be carried out entirely at atmospheric pressure. The resulting metallized patterns are perfectly stable and adhere very well to the substrate. The subsequent steps to complete the integrated circuit package and mount the semiconductor device within the package have been found to have no deleterious effect upon the metallized substrate.

Using the process of this invention, it is possible to apply a metal pattern around the corners of the substrate or upon other irregularities and contours normally present in ceramic materials. The metallized package parts readily form hermetic seals. Such hermetic seals were much more difficult to obtain with ceramic parts metallized using processes of the prior art.

Finally, considerably finer line definitions may be obtained with the process of the invention than with prior art processes because the metallizing is applied to a smooth decal surface rather than to the rough ceramic itself. This eliminated the process step previously required in the prior art of finely polishing the ceramic parts.

What is claimed is:

1. A process for applying a metal pattern to a devitrified ceramic substrate surface comprising:
   - applying to the devitrified ceramic substrate surface a decal having a nonconductive pattern of metal particles admixed with one or more metal oxides and a removable binder on a backing sheet;
   - heating said substrate and decal at a temperature below that required to sublime or substantially completely oxidize the metal, between about 250°— C. and 625° C. for a period of time between about 1 minute and 1 hour to separate the binder and the backing material from the metal pattern to leave the metal pattern alone remaining on the substrate; and heating the substrate and metal pattern to a temperature between about 800° C. and 1,600° C. in an atmosphere which is not conducive to oxidation of the metal pattern to bond the metal pattern to the substrate and to insure both that such metal pattern is fully electrically conductive and that any metal oxides formed in the first heating of the substrate and decal are substantially reduced.

2. The process of claim 1 further defined by the first heating step being carried out in an oxidizing atmosphere.

3. The process of claim 2 further defined by the second heating step being carried out in a reducing atmosphere.

4. The process of claim 3 further defined by said reducing atmosphere being a mixture of hydrogen and water.

5. The process of claim 1 further defined by the first heating step being carried out at a temperature between about 250° C. and 350° C.

6. The process of claim 1 further defined by said second heating step being carried out at a temperature between about 1,400° C. and 1,600° C.

* * * * *